(12) United States Patent
Breedon et al.

(10) Patent No.: US 12,472,341 B2
(45) Date of Patent: Nov. 18, 2025

(54) CHEST DRAIN CONNECTOR

(71) Applicants: THE NOTTINGHAM TRENT UNIVERSITY, Nottingham (GB); Nottingham University Hospitals NHS Trust, Nottingham (GB)

(72) Inventors: Philip Breedon, Nottingham (GB); Martin Beed, Nottingham (GB); Joshua Wright, Nottingham (GB); Luke Siena, Nottingham (GB); Joseph Meeks, Nottingham (GB)

(73) Assignees: THE NOTTINGHAM TRENT UNIVERSITY, Nottingham (GB); Nottingham University Hospitals NHS Trust, Nottingham (GB)

( * ) Notice: Subject to any disclaimer, the term of this patent is extended or adjusted under 35 U.S.C. 154(b) by 0 days.

(21) Appl. No.: 18/992,785

(22) PCT Filed: Jul. 14, 2023

(86) PCT No.: PCT/GB2023/051851
§ 371 (c)(1),
(2) Date: Jan. 9, 2025

(87) PCT Pub. No.: WO2024/013512
PCT Pub. Date: Jan. 18, 2024

(65) Prior Publication Data
US 2025/0262421 A1     Aug. 21, 2025

(30) Foreign Application Priority Data
Jul. 14, 2022   (GB) .................................. 2210372

(51) Int. Cl.
*A61M 39/10*   (2006.01)
*A61M 1/00*    (2006.01)
(Continued)

(52) U.S. Cl.
CPC .............. *A61M 39/10* (2013.01); *A61M 1/70* (2021.05); *A61M 1/84* (2021.05); *A61M 27/00* (2013.01);
(Continued)

(58) Field of Classification Search
CPC ........ A61M 39/045; A61M 2039/2426; A61M 39/24; A61M 2039/1027; A61M 39/26; A61M 2039/2433
See application file for complete search history.

(56) References Cited

U.S. PATENT DOCUMENTS

| 5,405,336 A | 4/1995 | Austin et al. |
| 5,484,401 A | 1/1996 | Rodriguez et al. |

(Continued)

FOREIGN PATENT DOCUMENTS

| EP | 1217284 A1 | 6/2002 |
| GB | 2620624 B | 9/2024 |
| WO | 2024013512 A1 | 1/2024 |

OTHER PUBLICATIONS

International Search Report dated Nov. 8, 2023 for corresponding International Application No. PCT/GB2023/051851, filed Jul. 14, 2023.

(Continued)

*Primary Examiner* — Courtney B Fredrickson
(74) *Attorney, Agent, or Firm* — David D. Brush; Westman, Champlin & Koehler, P.A.

(57) ABSTRACT

A breakaway chest drain connector, which includes a first part having an inlet for connecting to an upstream portion of a chest drain tube, a one-way valve and a first flange surrounding the one-way valve; and a second part having an outlet for connecting to a downstream portion of the chest tube, a second flange and a hollow protrusion, the second flange surrounding the hollow protrusion. The second part is (Continued)

connectable to the first part by securing the first flange to the second flange such that the hollow protrusion passes through the one-way valve to form an uninterrupted fluid flow passage from the inlet through the hollow protrusion and the outlet along a longitudinal axis of the connector. The first and second flanges are separable by applying a longitudinal separation force above a defined threshold separation force.

20 Claims, 7 Drawing Sheets

(51) Int. Cl.
     *A61M 27/00*     (2006.01)
     *A61M 39/02*     (2006.01)
     *A61M 39/04*     (2006.01)
     *A61M 39/24*     (2006.01)
     *A61M 39/26*     (2006.01)

(52) U.S. Cl.
     CPC ...... *A61M 39/0208* (2013.01); *A61M 39/045* (2013.01); *A61M 39/24* (2013.01); *A61M 39/26* (2013.01); *A61M 2039/1016* (2013.01); *A61M 2039/2426* (2013.01); *A61M 2210/101* (2013.01)

(56) References Cited

U.S. PATENT DOCUMENTS

| | | | |
|---|---|---|---|
| 2005/0015075 A1* | 1/2005 | Wright | A61M 39/14 604/535 |
| 2005/0121081 A1 | 6/2005 | Corbeil et al. | |
| 2009/0232586 A1* | 9/2009 | Diodati | F16L 37/32 403/14 |
| 2015/0157849 A1 | 6/2015 | Phillips et al. | |
| 2019/0143094 A1 | 5/2019 | Demeritt | |
| 2020/0164123 A1 | 5/2020 | Salvino et al. | |

OTHER PUBLICATIONS

Written Opinion of the International Searching Authority dated Nov. 8, 2023 for corresponding International Application No. PCT/GB2023/051851, filed Jul. 14, 2023.
Great Britain Search Report dated Dec. 21, 2022 for corresponding Great Britain Application No. 2210372.5, filed Jul. 14, 2022.
Akram & Hartung, "Intercostal Chest Drains: a wake up call from the National Patient Safety Agency rapid response report", J R Coll Physicians Edinb 2009; 39:117-20.
Asciak et al., "Chest Drain Fall-Out Rate According to Suturing Practices: A Retrospective Direct Comparison", Respiration, 96 (1), 48-51, 2018.
Cafarotti et al., "Small-bore wire-guided chest drains: Safety, tolerability, and effectiveness in pneumothorax, malignant effusions, and pleural empyema", The Journal of Thoracic and Cardiovascular Surgery, 141 (3), 683-687, 2011.
Millar & Hillman, "Managing Chest Drains on Medical Wards", British Medical Journal, 2018.
Hooper & Maskell, "British Thoracic Society national pleural procedures audit 2010", Thorax, 66 (7), 636-637, 2011.
Hooper et al., "Pleural procedures and patient safety: a national BTS audit of practice", Thorax, 70 (2), 189-19, 2014.
Kirmani & Zacharias, "Insertion of a chest drain for pneumothorax", Anaesthesia & Intensive Care Medicine, 20 (4), 235-237, 2019.
Meeks, "Chest Drain Detachment Valve", BSc Product Design project report, Nottingham Trent University, 2016.
Paramasivam & Bodenham, "Air leaks, pneumothorax, and chest drains", Continuing Education in Anaesthesia Critical Care & Pain, 8 (6), 204-209, 2008.
Porcel, "Chest tube drainage of the pleural space: A concise review for pulmonologists". Tuberculosis and Respiratory Diseases, 81 (2), 106-115, 2018.
Sundaralingam et al., "The Frequency, Risk Factors, and Management of Complications From Pleural Procedures", Chest, 161 (5), 1407, 2022.
Ringel et al., "Intercostal Chest Drain Fixation Strength: Comparison of techniques and sutures", BMJ Mil Health, 2021.
Asciak et al., "British Thoracic Society Clinical Statement on pleural procedures", Thorax 2023;0:1-25.
Havelock et al., "Pleural procedures and thoracic ultrasound: British Thoracic Society pleural disease guideline 2010", Thorax 2010;65.
Harris et al., "Survey of major complications of intercostal chest drain insertion in the UK", Postgrad Med J 2010;86:68-72.

* cited by examiner

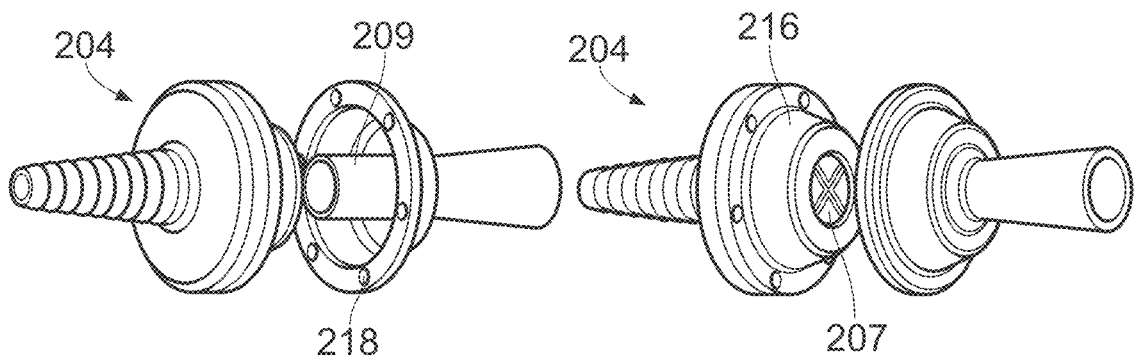
FIG. 4a   Valve Disconnected   FIG. 4b
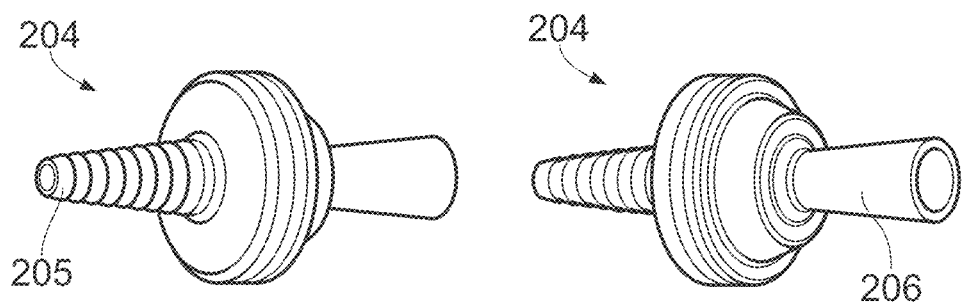
FIG. 4c   Valve Connected   FIG. 4d
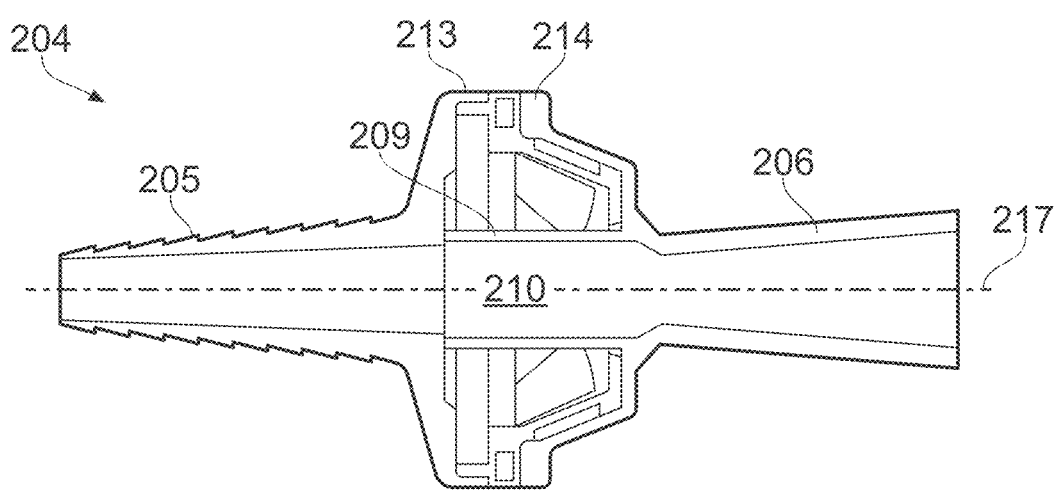
FIG. 5

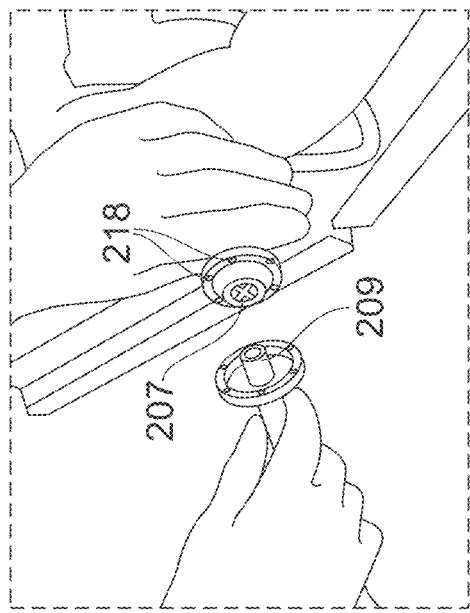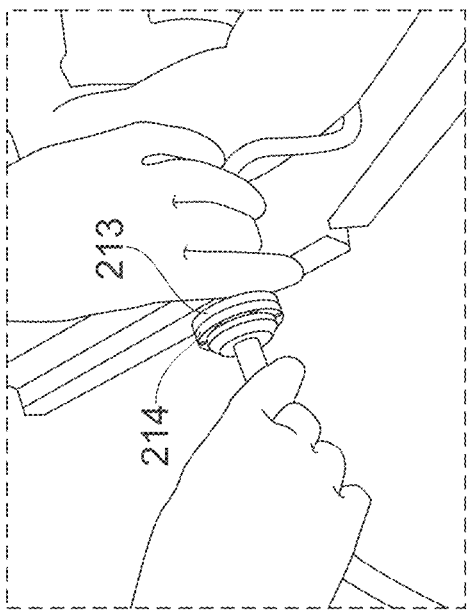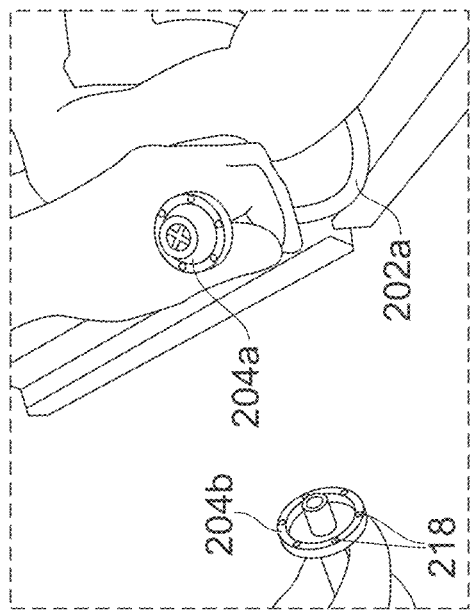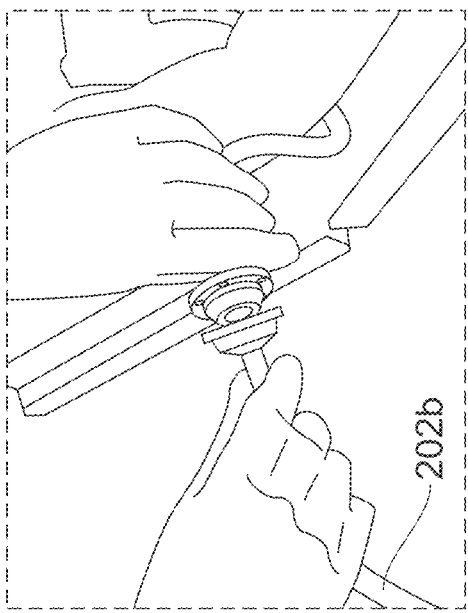

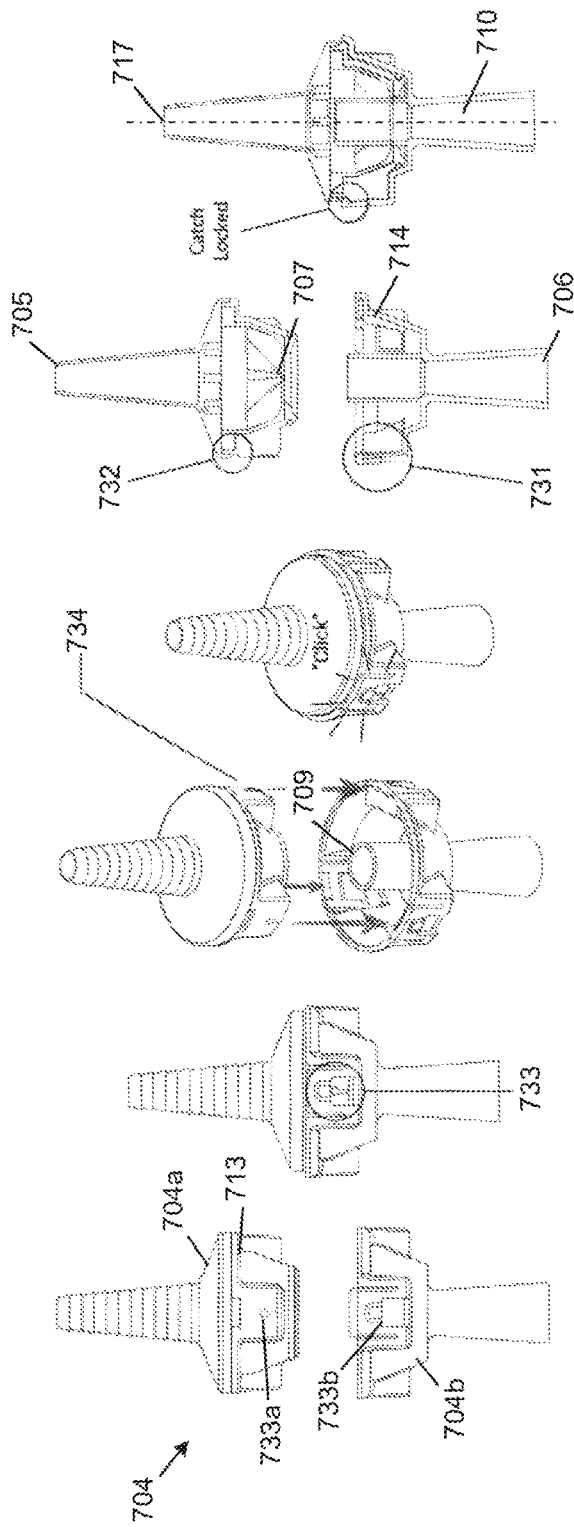

CHEST DRAIN CONNECTOR

CROSS-REFERENCE TO RELATED APPLICATIONS

This Application is a Section 371 National Stage Application of International Application No. PCT/GB2023/051851, filed Jul. 14, 2023, and published as WO 2024/013512 A1 on Jan. 18, 2024, in English, which claims priority to and the benefit of Great Britain Patent Application No. 2210372.5, filed Jul. 14, 2022, the contents of which are incorporated herein by reference in their entireties.

FIELD OF THE INVENTION

The invention relates to a breakaway chest drain connector.

BACKGROUND

A chest drain, also known as a pleural or intercostal drain (ICD), is a medical tube inserted between the ribs into the space between the lung and internal chest wall (the pleural cavity). Fluid, i.e. air and liquid, can leak into the space around the lung after infection or injury. This can be drained using a chest drain, allowing the lung to re-expand. It is estimated that world-wide over one million chest drains are inserted annually, with a minimum estimate of at least thirty thousand inserted within the UK each year.

Chest drains are usually held in place by being stitched to the chest skin. However, in some cases chest drains can be accidentally moved or pulled out, which can be painful for the patient as well as being dangerous due to the possibility of air re-entering the patient and collapsing the lung again, as well as an increased risk of infection. Whenever a chest drain is pulled out it must be replaced, resulting in more discomfort for the patient, after which the patient must have another X-ray to ensure that the chest tube is correctly located. This all results in additional burdens on the patient and on treatment time and costs.

Sutures can reduce the chance of the chest tube being pulled out, but there is still around a 7% chance of accidental removal. A balloon ICD may be used to more securely fasten the chest drain in the patient, but if dislodged this can result in a larger hole at the point of incision, requiring further repair and risk of adverse events. Portable chest drains may reduce the risk of removal, but tend to have smaller capacities and are not suitable for when a chest drain needs to be kept in for a prolonged period to drain large amounts of fluid.

Drain displacement affects both Seldinger chest drains (smaller, 12-14 French gauge drains inserted using a needle and guidewire system) as well as larger 24-32 French gauge drains that require a surgical incision for insertion of the tube. Regardless of the size used, most drains have a one-way valve incorporated into the collecting system. The most common system used is a bottle with a water trap, which allows fluid to drain from the chest whilst preventing air from re-entering. The bottle must be positioned lower than the patient's chest to allow gravity to drain the pleural cavity. This requires long tubing connecting the drain to the bottle, which can easily become caught and dislodged when moving a patient, resulting in the chest drain itself coming under tension.

SUMMARY

According to a first aspect there is provided a chest drain connector comprising:
- a first part having an inlet for connecting to an upstream portion of a chest drain tube, a one-way valve and a first flange surrounding the one-way valve;
- a second part having an outlet for connecting to a downstream portion of the chest tube, a second flange and a hollow protrusion, the second flange surrounding the hollow protrusion,
- wherein the second part is connectable to the first part by securing the first flange to the second flange such that the hollow protrusion passes through the one-way valve to form an uninterrupted fluid flow passage from the inlet through the hollow protrusion and the outlet along a longitudinal axis of the connector, the first and second flanges being separable by applying a longitudinal separation force above a defined threshold separation force.

The connection between the first and second flanges creates a weak point along the chest drain tube so that, if the tubing becomes caught, for example while a patient is being moved, the chest drain separates safely by separating the first and second parts. Once the connector has broken away, the one-way valve operates to allow fluid to pass through the first part of the connector while preventing air from entering. The chest drain can then be simply reconnected to the drainage bottle to continue draining the pleural cavity.

With the first and second parts connected to each other, the hollow protrusion of the second part passes through and bypasses the one-way valve, allowing free flow of fluids through the connector. When the first and second parts are separated from each other, the one-way valve in the first part closes and allows fluids to pass through the first part in only one direction, i.e. from the first part to the second part and, when in use, away from the patient. The hollow protrusion of the second part, when the second part is disconnected from the first part, is partially shrouded by the second flange, thereby reducing the possibility of contamination when the first and second parts are disconnected and then reconnected.

The one-way valve may be in the form of a slit valve, for example a cross-slit valve.

The chest drain connector may comprise a gasket configured to provide a fluid seal between the first and second parts when connected.

The first part may comprise a conical portion surrounding the one-way valve and the second part a conical portion surrounding the hollow protrusion, an outer surface of the conical portion of the first part configured to seal against an inner surface of the conical portion of the second part. The, or a, gasket may be provided on the outer surface of the conical portion of the first part and/or on the inner surface of the conical portion of the second part. The, or a, gasket may alternatively be provided on an outer end face of the conical portion of the first part and/or an inner end face of the conical portion of the second part.

Securing the first flange to the second flange allows the first and second parts to be separated with a defined separation force. In some examples, the first and/or second flange may comprise one or more magnets such that the first and second flanges are magnetically connectable to each other. In some examples, one or both of the first and second flanges comprise a plurality of magnets arranged around a periphery of the flange. The use of magnets allows for the separation force to be designed such that the first and second parts separate from each other if a force above a predefined threshold is applied. The threshold separation force may for example be above around 5N, for example above around 10N or between around 5N and 20N. The separation force should be sufficiently high to maintain connection of the first and second parts during normal use but allow the first and second parts to become separated without risking the chest drain tube becoming dislodged from the patient. The plurality of magnets may for example be neodymium iron boride magnets, which may have a diameter of between around 1 and 3 mm. A 1 mm diameter N42 grade neodymium based magnet can, for example achieve a separation force of around 0.2N, while a 3 mm diameter magnet can achieve a separation force of around 2N. The choice of type, size and number of magnets used can therefore enable a defined separation force to be achieved. An array of six 3 mm diameter magnets around each of the first and second flanges may for example provide for a separation force of around 12N.

In other examples, the first and second flanges may be connectable to each other using one or more releasable catches configured to separate if a longitudinal separation force above the predefined threshold is applied between the first and second parts and configured to allow the first and second parts to be reconnectable. Such releasable and reconnectable catches may for example have the form of flexible protrusions extending from the first and/or second flanges that provide a push fit connection between the first and second parts. Separation of the first and second parts may be achieved by pulling apart the connector along the longitudinal axis and the parts can be reconnected by pushing the parts together. The separation force using such releasable catches may be designed by design of the flexible protrusions.

The one or more releasable catches may comprise a catch on one of the first and second parts and a corresponding slot on the other of the first and second parts.

An advantage of using either magnets or flexible releasable catches is that a definite connection between the first and second parts can be felt by the user as the parts are assembled together, with a definite click provided when pushing the parts together so that the user is confident that the parts are secured.

The inlet of the first part may be configured to connect to the upstream portion of the chest drain tube by securing the inlet within the upstream portion of the chest drain tube. An outer surface of the inlet may have a tapered barbed shape.

The outlet of the second part may have a tapered inner surface for connecting to an outer surface of the downstream portion of the chest drain tube, for example to a barbed connector on the downstream portion of the chest drain tube. The outlet may alternatively have an outer surface with a tapered barbed shape for securing the outlet within the downstream portion of the chest drain tube.

The first part may comprise a pressure relief valve configured to allow fluid to escape from the first part above a preset pressure when the first and second parts are disconnected from each other.

According to a second aspect, there is provided a chest drain kit, comprising:
a fluid collection vessel;
a chest drain tube having an upstream portion for securing to a patient and a downstream portion for securing to the fluid collection vessel; and
a chest drain connector according to the first aspect.

According to a third aspect there is provided a method of assembling a chest drain kit, the method comprising:
providing a chest drain kit according to the second aspect;
connecting the first part of the chest drain connector to the upstream portion of the chest drain tube;
connecting the second part of the chest drain connector to the downstream portion of the chest drain tube;
connecting the downstream portion of the chest drain tube to the fluid collection vessel; and
connecting the first and second parts of the chest drain connector together.

The method may further comprise separating the chest drain connector by applying a longitudinal separation force above the defined threshold separation force.

The method may further comprise securing the upstream portion of the chest drain tube to a patient to drain fluid from the patient's pleural cavity.

BRIEF DESCRIPTION OF THE DRAWINGS

The invention is described in further detail below by way of example and with reference to the accompanying drawings, in which:

FIGS. 4a-4d are drawings of an example breakaway chest drain tube connector from different perspectives;

FIG. 5 is a cross-sectional drawing of an example breakaway chest drain tube connector;

FIGS. 6a-d are photographs illustrating a method of assembling an example breakaway chest drain tube connector;

FIGS. 7a-7f are drawings of an alternative breakaway chest drain tube connector having a mechanical connection.

DETAILED DESCRIPTION

Figure 1:
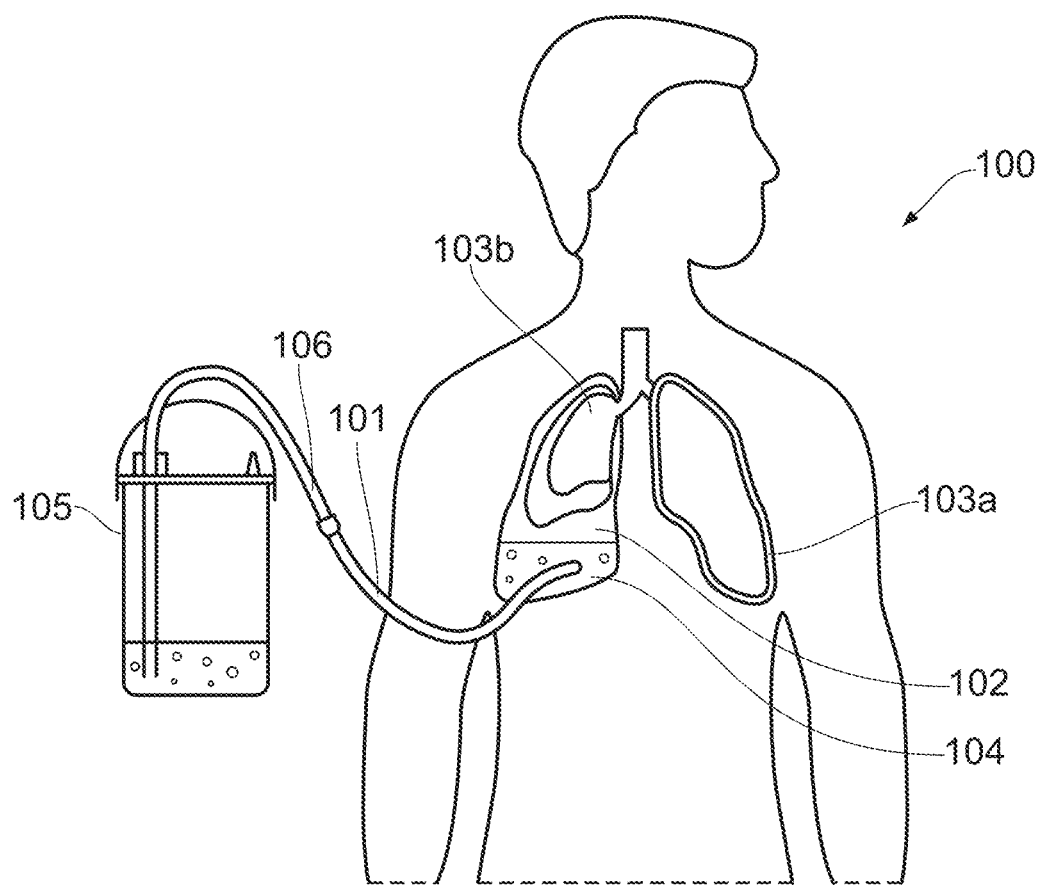
FIG. 1 is a schematic diagram of a chest drain tube attached to a patient.

FIG. 1 illustrates a patient 100 with a chest tube 101 inserted into the pleural cavity 102 of one of the patient's lungs 103a, 103b, the lung 103b having collapsed. Fluid including air and liquid 104 is collecting in the pleural cavity 102 and needs to be drained. The chest tube 101 is secured to the patient 100 and extends into the pleural cavity 102 to enable the fluid to be drained through the tube 102 and into a collection vessel 105 via a collection tube 106. As described in the background section above, a problem with this arrangement is that the chest tube 101 can become dislodged from the patient 100 if the patient is moved or rolls over, requiring the tube 101 to be reattached and creating injury as well as a risk of infection.

Figure 2:
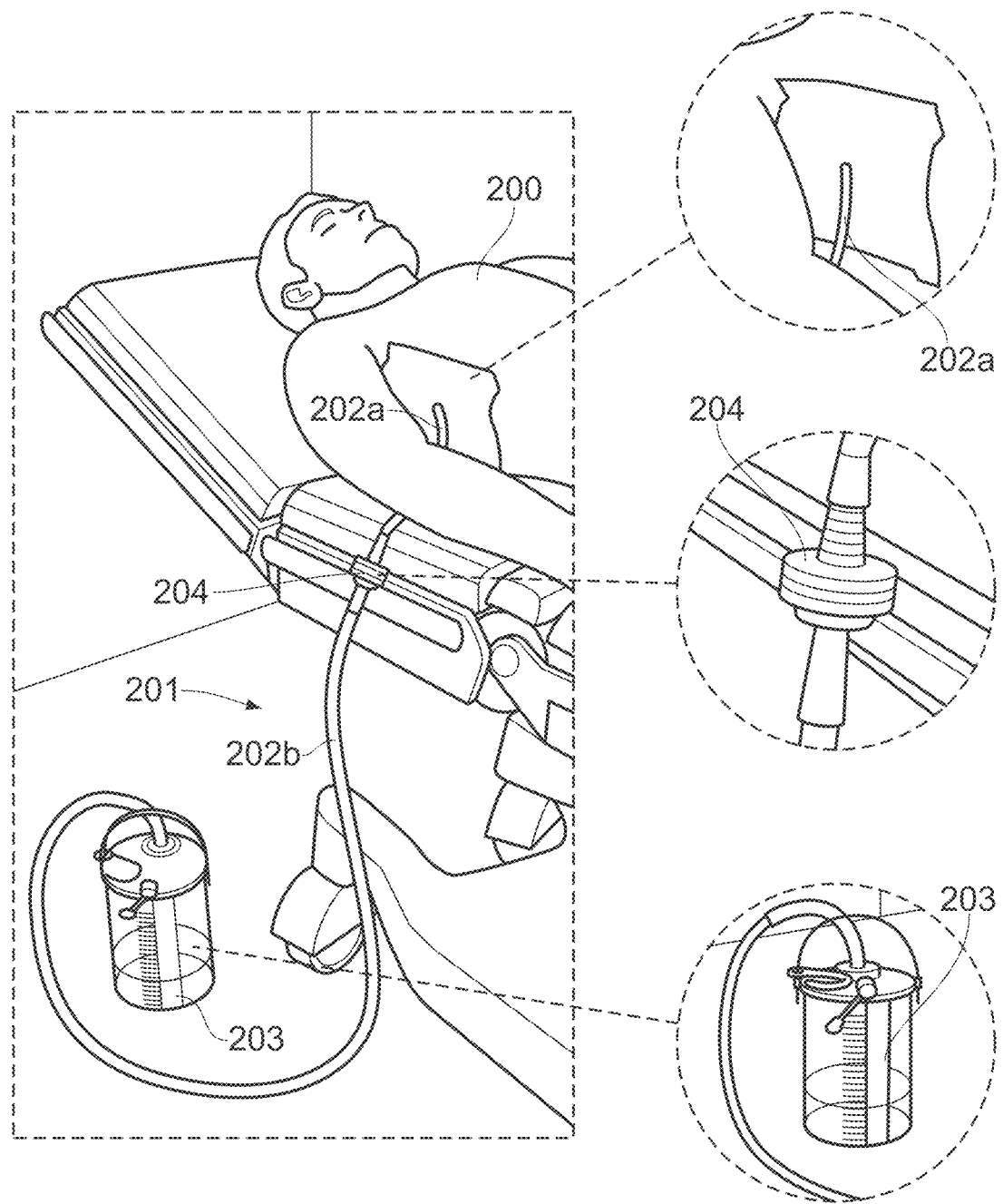
FIG. 2 is a photograph of a dummy patient with an installed chest drain tube, showing detailed views of a breakaway chest drain tube connector, bottle and sutured connection to the patient.

FIG. 2 is a photograph of a dummy patient 200 with an example chest drain assembly 201 attached. The chest drain assembly 201 comprises a chest drain tube having an upstream portion 202a and a downstream portion 202b, the downstream portion 202b attached to a fluid collection vessel 203 and the upstream portion 202a sutured to the patient 200 and passing into the patient's pleural cavity. A breakaway chest drain connector 204 connects the upstream and downstream portions 202a, 202b of the chest drain tube.

Detailed views of the upstream portion 202a, connector 204 and collection vessel 203 are shown alongside the main photograph. The chest drain assembly 201 may be provided as a chest drain kit, with the upstream and downstream portions 202a, 202b of the chest tube provided with the collection vessel 203 and a chest drain connector 204.

Figure 3A:
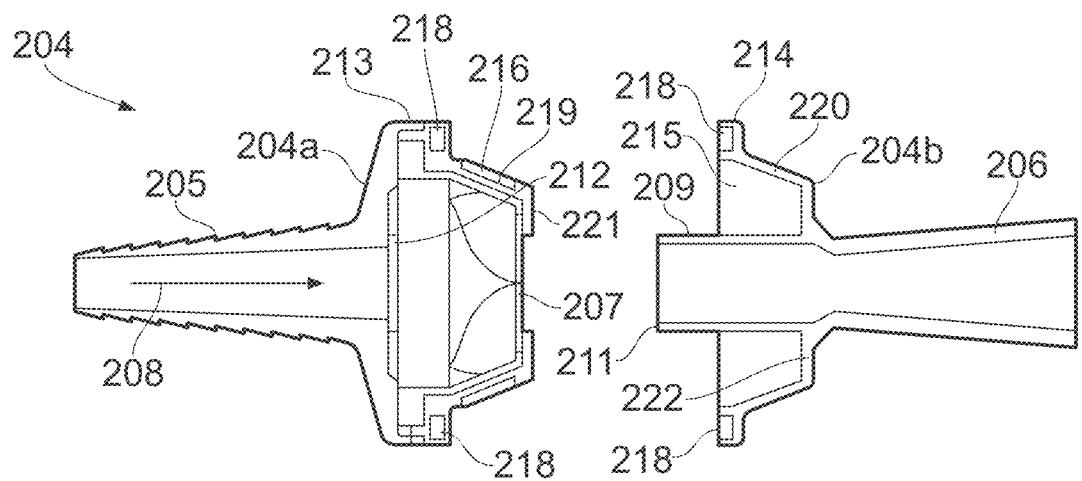
FIGS. 3a and 3b are cross-sectional diagrams of an example breakaway chest drain tube connector with first and second parts separated and connected.
Figure 3B:
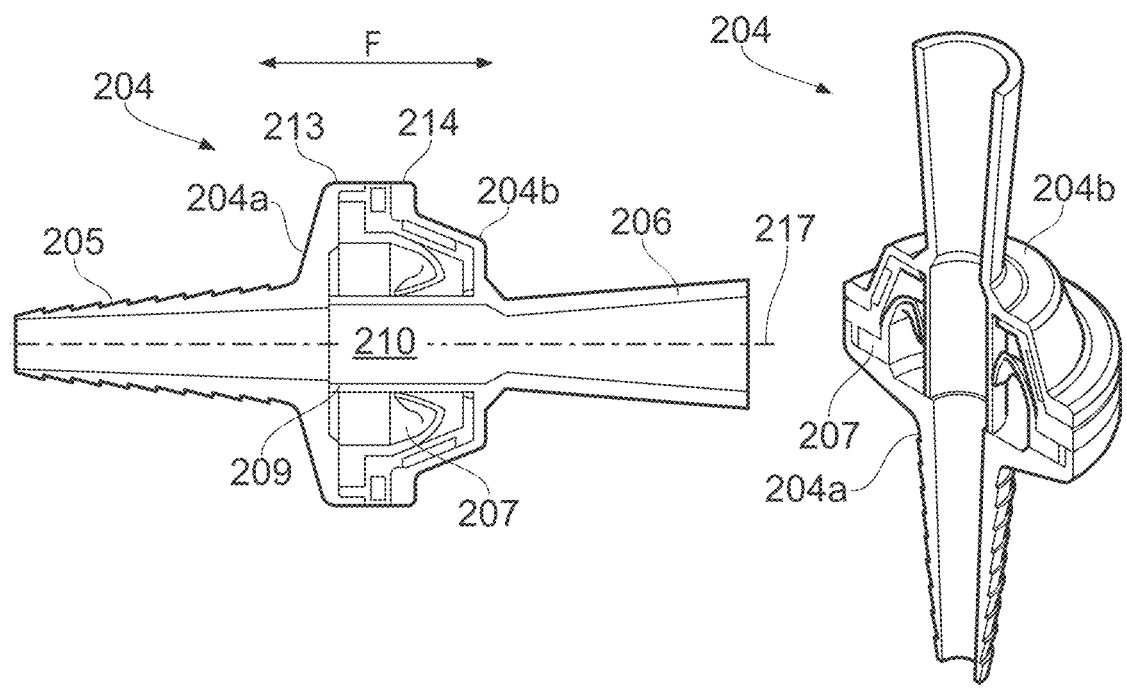

FIG. 3 illustrates cross-sectional views of the example breakaway chest drain connector 204, with the connector 204 shown separated in FIG. 3a and connected in FIG. 3b. The connector 204 comprises a first part 204a and a second part 204b. The first part 204a has an inlet 205 for connection to the upstream portion 202a of the chest drain tube. The second part 204b has an outlet 206 for connection to the downstream portion 202b of the chest drain tube. A one-way valve 207 in the first part 204a allows fluid to flow through the first part 204a in a downstream direction 208 when the first and second parts 204a, 204b are separated. A hollow protrusion 209 in the second part 204b is configured to pass through the one-way valve 207 when the first and second parts 204a, 204b are connected, as shown in FIG. 3b, thereby bypassing the one-way valve 207 and forming an uninterrupted flow passage 210 from the inlet 205 through the hollow protrusion 209 and the outlet 206 along a longitudinal axis 217 of the connector 204. As illustrated in FIG. 3b, the one-way valve 207 is inverted by the hollow protrusion 209 when the first and second parts 204a, 204b of the connector are connected together. The one-way valve 207 therefore needs to be sufficiently flexible to invert, requiring the one-way valve 207 to be made from a flexible material such as a silicone rubber. As more clearly illustrated in FIG. 4b, the one-way valve 207 may be a cross-slit valve, i.e. with two transverse slits across the face of the valve 207. This arrangement allows the valve to be more easily opened compared to a single slit valve, providing less resistance to the hollow protrusion 209 of the second part 204b being inserted when the connector is assembled.

With the first and second parts 204a, 204b connected, an upstream end 211 of the hollow protrusion 209 seals against a downstream end 212 of the inlet 205 to form the uninterrupted flow passage 210. When connected to the upstream and downstream parts 202a, 202b of the chest tube, the connector 204 thereby provides little or no restriction to fluid flow between the patient at one end of the chest tube and the collection vessel at the other end, with the collection vessel providing a non-return valve, typically with a water trap as described above. However, when the connector 204 is separated, the one-way valve 207 closes so that the first part 204a prevents fluid (particularly air) from flowing upstream towards the patient but still allowing fluid to flow downstream through the first part 204a while the second part 204b is disconnected.

The first part 204a comprises a first flange 213 surrounding the one-way valve 207 and the second part 204b comprises a second flange 214 surrounding the hollow protrusion 209. The first and second flanges 213, 214 are arranged to secure the first and second parts 204a, 204b to each other when the connector 204 is connected, as shown in FIG. 3b. The second flange 214 defines a cavity 215 within which the one-way valve 207 is contained when the first and second parts 204a, 204b are connected. The first part 204a comprises a gasket 216 between the one-way valve 207 and the first flange 213, which secures the one-way valve 207 to the first part 204a and provides a fluid seal around the one-way valve 207 when the first and second parts 204a, 204b are connected. In alternative examples a gasket may be provided on the second part 204b or may be provided on both parts 204a, 204b. In the illustrated example of FIGS. 3a and 3b, the gasket 216 is provided on an outer surface of a conical portion 219 of the first part 204a surrounding the one-way valve 207. An inner surface of a corresponding conical portion 220 of the second part 204b is configured to seal against the outer surface of the conical portion 219 of the first part, with the gasket 216 providing a fluid seal between the parts 204a, 204b. In alternative examples, a gasket may be provided on the inner surface of the conical portion 220 of the second part. The conical portions 219, 220 serve to allow the parts 204a, 204b to be more easily connected together, ensuring that the connection aligns the longitudinal axis 217 of the parts when connected. The conical portion 220 of the second part also serves to partially shroud the hollow protrusion 209 when the parts 204a, 204b are disconnected, reducing the possibility of contamination.

A gasket may also or alternatively be provided on an outer end face 221 of the conical portion 219 of the first part 204a and/or on an inner end face 222 of the conical portion 220 of the second part 204b to provide a fluid seal between the first and second parts 204a, 204b when the parts are connected.

An advantage of the second flange 214 surrounding the hollow protrusion 209 is that the hollow protrusion 209 is partially shrouded by the second flange 214 when the second part 204b is disconnected. This reduces the risk of contamination of the fluid passage through the second part 204b when the parts are disconnected.

With the first and second parts 204a, 204b connected, the first and second flanges 213, 214 are secured together to maintain the connector 204 in the configuration shown in FIG. 3b, allowing free flow of fluid from the patient through the connector 204. The connector 204 can be separated if a separation force F is applied along the longitudinal axis 217 of the connector 204 that is sufficient to break the connection between the flanges 213, 214, i.e. is above a defined threshold separation force.

The threshold separation force keeping the parts 204a, 204b together may be provided by a magnetic attraction between the first and second parts 204a, 204b. One or more magnets 218 on the first and/or second parts 204a, 204b may be provided to secure the first and second flanges 213, 214 together. In some arrangements, magnets 218 may be provided in both parts 204a, 204b, with the magnets 218 being oriented to attract each other, i.e. with opposing poles facing each other upon bringing the flanges 213, 214 together. In other arrangements, one of the flanges 213, 214 may comprise one or more magnets while the other flange comprises one or more corresponding ferritic portions. To increase the separation force while minimising weight and volume of the parts, multiple high strength magnets, such as neodymium iron boride magnets, may be used on each part 204a, 204b. In a particular example, multiple magnets provided on each part 204a, 204b together provide an attraction requiring a separation force of greater than around 10N. Other examples may require a different separation force threshold, for example greater than around 5N or between around 5N and 20N, which can be adjusted by adjusting the number and strength of magnets provided on each part 204a, 204b. The magnets 218 may be encased in plastic or embedded within the flange 213, 214 to secure and shield the magnets.

In alternative examples, a threshold separation force may be achieved by securing the parts 204a, 204b together mechanically rather than magnetically. This may, for example, be achieved using one or more releasable catches that are configured to separate if a longitudinal separation force above a defined threshold force is applied. An advantage of using magnetic attraction, however, is that the threshold separation force can be reliably repeatable and the surfaces of the parts 204a, 204b are simpler to keep clean with less scope for contaminants.

The inlet 205 of the connector 204 as shown in FIGS. 3 and 4, has an outer surface that has a tapered barbed shape, also known as a 'christmas tree' coupling, which enables the inlet 205 to be secured within the upstream portion of the chest drain tube. The outlet 206 of the connector 204 shown in FIGS. 3 and 4 has a tapered inner surface that enables an outer surface of the downstream portion of the chest drain tube to be secured within the outlet 206. The outlet 206 may have an inverted 'christmas tree' form, i.e. with an inverse tapered barbed shape to that of the inlet 205. Other alternative arrangements for the inlet 205 and outlet 206 may be provided for connection to the upstream and downstream portions of the chest drain tube.

FIG. 5 illustrates the chest drain connector 204 with the first and second parts 204a, 204b connected, forming an interrupted fluid flown channel 210 along a longitudinal axis from the inlet 205 through the hollow protrusion 209 and the outlet 206. The first and second flanges 213, 214 are connected together such that the hollow protrusion 209 passes through the one-way valve to form the uninterrupted flow passage 210.

FIGS. 6a-d are a series of photographs illustrating a connector 204 being assembled from first and second parts 204a, 204b, either during installation of a chest drain kit or after disconnection of the connector 204 following movement of the patient. The first part 204a is connected to the upstream portion 202a of the chest drain tube and the second part 204b is connected to the downstream portion 202b of the chest drain tube. In FIG. 6a the parts 204a, 204b are separated from one another ready to be assembled. In FIG. 6b the parts 204a, 204b are brought together and in FIG. 6c the hollow protrusion 209 of the second part is pushed though the one-way valve 207 of the first part until, in FIG. 6d, the parts 204a, 204b are brought into contact as the flanges 213, 214 connect together, in this case using a corresponding plurality of magnets 218 around the periphery of each flange 213, 214. The chest drain is then ready for use, or continued use, with the connector 204 providing an uninterrupted flow passage from the upstream portion 202a to the downstream portion 202b through to a chest drain collection vessel connected to the end of the downstream portion 202b.

FIGS. 7a to 7f illustrate in a series of drawings an alternative example of a breakaway chest drain connector 704 having a first (or female) part 704a and a second (or male) part 704b. FIGS. 7a and 7b illustrate a front view of the connector 704, with the first and second parts disconnected in FIG. 7a and connected in FIG. 7b. FIGS. 7c and 7d illustrate a ¾ view of the connector 704, with the first and second parts disconnected in FIG. 7c and connected in FIG. 7d. FIGS. 7e and 7f illustrate a section view of the connector 704, with the first and second parts disconnected in FIG. 7e and connected in FIG. 7f.

As with the connector 204 described above, the first part 704a comprises an inlet 705 for connecting to an upstream portion of a chest drain tube, a one-way valve 707 and a first flange 713 surrounding the one-way valve 707. The second part 704b comprises an outlet 706 for connecting to a downstream portion of the chest drain tube, a second flange 714 and a hollow protrusion 709, the second flange 714 surrounding the hollow protrusion 709. The second part 704b is connectable to the first part 704a by securing the first flange 713 to the second flange 714 such that the hollow protrusion 709 passes through the one-way valve 707 to form an uninterrupted fluid flow passage 710 from the inlet 705 through the hollow protrusion 709 and the outlet 706 along a longitudinal axis 717 of the connector 704. The first and second flanges 713, 714 are separable by applying a longitudinal separation force above a defined threshold separation force. In this example, the first and second flanges 713, 714 are connectable to each other using one or more releasable catches configured to separate on applying a longitudinal separation force above the predefined separation force. In the illustrated example, a catch 731 is provided on the second part 704b that engages with a corresponding slot 732 in the first part 704a. The arrangement may be reversed, i.e. with the catch 731 on the first part 704a and the slot 732 in the second part. One or more guides 734 may also be provided to ensure that the first and second parts 704a, 704b align correctly.

As indicated in FIG. 7d, when the first and second parts 704a, 704b are engaged with each other, the catch 731 engages with the slot 732 to form a mechanical latch holding the parts together. When connected, the catch and slot engage with a click, assuring the user that the connector parts are properly engaged. This may be achieved using one or more live hinges, i.e. polymer parts that are configured to flex as the parts are engaged with each other to achieve the required mechanical latching effect.

A visual indicator 733 may be provided to indicate when the parts 704a, 704b are properly engaged with each other. In the example shown in FIGS. 7a and 7b, the visual indicator 733 is in the form of a representation of a padlock 733b on the second part 704b, to which a keyhole 733a is included once the first part 704a is properly engaged with the second part 704b. Other two-part representations may be provided that, when engaged together, provide a visual indicator that the parts are correctly engaged with each other. In a general aspect therefore, the first part 704a comprises a first portion 733a of a visual representation 733 and the second part 704b comprises a second portion 733b of the visual representation 733, the visual representation 733 being assembled when the first and second parts are connected to each other.

Figure 8C:
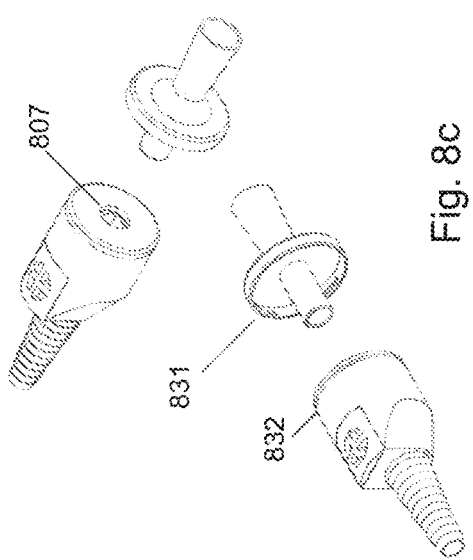
FIGS. 8a-8c are drawings of a further alternative breakaway chest drain tube connector having a pressure relief valve.
Figure 8B:
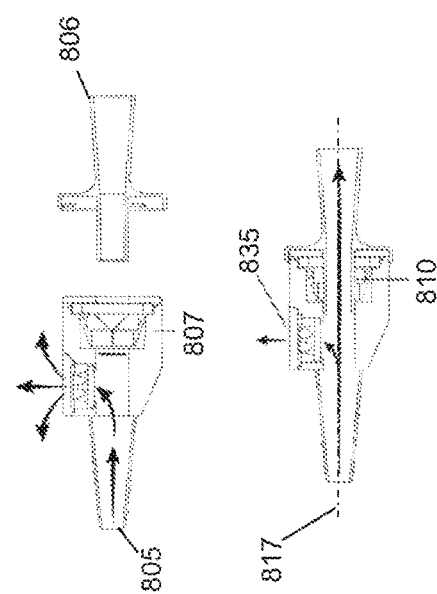
Figure 8A:
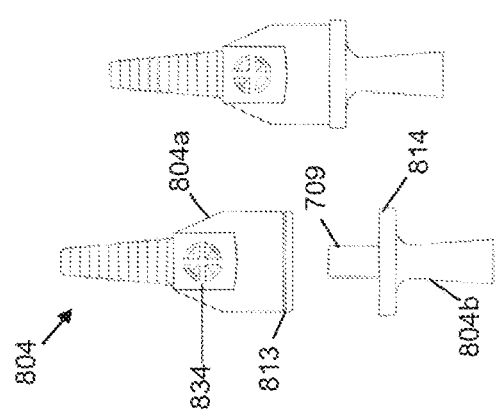

FIGS. 8a to 8c illustrate in a series of drawings a further alternative example of a breakaway chest drain connector 804 having a first (or female) part 804a and a second (or male) part 804b. FIG. 8a illustrates a front view of the connector 804, with the first and second parts connected and disconnected. FIG. 8b illustrates a sectional view of the connector 804 with the first and second parts connected and disconnected. FIG. 8c illustrate a perspective view of the connector 804, with the first and second parts connected and disconnected.

As with the connectors 204 and 704 described above, the first part 804a comprises an inlet 805 for connecting to an upstream portion of a chest drain tube, a one-way valve 807 and a first flange 813 surrounding the one-way valve 807. The second part 804b comprises an outlet 806 for connecting to a downstream portion of the chest tube, a second flange 814 and a hollow protrusion 809, the second flange 814 surrounding the hollow protrusion 809. The second part 804b is connectable to the first part 804a by securing the first flange 813 to the second flange 814 such that the hollow protrusion 809 passes through the one-way valve 807 to form an uninterrupted fluid flow passage 810 from the inlet 805 through the hollow protrusion 809 and the outlet 806 along a longitudinal axis 817 of the connector 804. The first and second flanges 813, 814 are separable by applying a longitudinal separation force above a defined threshold separation force.

In this example, the first and second flanges 813, 814 are connectable to each other using one or more releasable catches configured to separate on applying a longitudinal separation force above the predefined separation force. In the illustrated example, a catch 831 is provided on the second part 804b that engages with a corresponding slot or groove 832 in the first part 804a. The arrangement may be reversed, i.e. with the catch 831 on the first part 804a and the groove 832 in the second part. In this example, the relative rotational alignment of the first and second parts 804a, 804b is not relevant, so there is no need for a guide to ensure correct engagement of the first and second parts 804a, 804b.

When the first and second parts 804a, 804b are engaged with each other, the catch 831 engages with the groove 832 to form a mechanical latch holding the parts together. When connected, the catch 831 and slot 832 engage with a click, assuring the user that the connector parts 804a, 804b are properly engaged. This may be achieved through flexibility of the flange 814 on the second part 804b.

The connector 804 further comprises a pressure relief valve 834 in the first part 804a, which is a one-way valve that is configured to allow fluid to escape from the first part 804a above a preset pressure when the first and second parts 804a, 804b are disconnected from each other, as shown in FIG. 8b. This allows discharge of fluid from the first part 804a under pressure when the parts are disconnected, preventing an excessive pressure build-up. The pressure relief valve 834 is provided on a side of the first part 804a to not interfere with the flow passage 810 when the parts 804a, 804b are connected together. The pressure relieve valve 834 may also allow for discharge 835 from the connector 804 when the first and second parts 804a, 804b are connected to each other if the pressure in the flow passage 810 exceeds the preset pressure.

Other embodiments are intentionally within the scope of the invention, which is defined by the appended claims.

The invention claimed is:

1. A chest drain connector comprising:
   a first part having an inlet for connecting to an upstream portion of a chest drain tube, a one-way valve and a first flange surrounding the one-way valve;
   a second part having an outlet for connecting to a downstream portion of the chest tube, a second flange and a hollow protrusion, the second flange surrounding the hollow protrusion,
   wherein the second part is connectable to the first part by securing the first flange to the second flange such that the hollow protrusion passes through the one-way valve to form an uninterrupted fluid flow passage from the inlet through the hollow protrusion and the outlet along a longitudinal axis of the connector, the first and second flanges being separable by applying a longitudinal separation force above a defined threshold separation force,
   wherein the one-way valve is a cross-slit valve that allows fluid to flow through the first part in a downstream direction while preventing air from entering the first part when the first and second parts are separated and is inverted by the hollow protrusion when the first and second parts of the connector are connected together.

2. The chest drain connector of claim 1 comprising a gasket configured to provide a fluid seal between the first and second parts when connected.

3. The chest drain connector of claim 2, wherein the first part comprises a conical portion surrounding the one-way valve and the second part comprises a conical portion surrounding the hollow protrusion, an outer surface of the conical portion of the first part configured to seal against an inner surface of the conical portion of the second part.

4. The chest drain connector of claim 3, wherein the gasket is provided on the outer surface of the conical portion of the first part and/or on the inner surface of the conical portion of the second part.

5. The chest drain connector of claim 3, wherein the gasket is provided on an outer end face of the conical portion of the first part and an inner end face of the conical portion of the second part.

6. The chest drain connector of claim 1, wherein an upstream end of the hollow protrusion seals against a downstream end of the inlet to provide the uninterrupted fluid flow passage when the first and second parts are connected.

7. The chest drain connector of claim 1 wherein the first and second flange comprises one or more magnets such that the first and second flanges are magnetically connectable to each other.

8. The chest drain connector of claim 7 wherein the first and second parts comprise a plurality of magnets arranged around a periphery of the flange.

9. The chest drain connector of claim 7, wherein the one or more magnets are neodymium iron boride magnets.

10. The chest drain connector of claim 1 wherein the first and second flanges are connectable to each other using one or more releasable catches configured to separate on applying the longitudinal separation force above the predefined threshold separation force.

11. The chest drain connector of claim 10, wherein the one or more releasable catches comprises a catch on one of the first and second parts and a corresponding slot on the other of the first and second parts.

12. The chest drain connector of claim 1, wherein the threshold separation force is above 5N.

13. The chest drain connector of claim 12, wherein the threshold separation force is between 5N and 20N.

14. The chest drain connector of claim 1 wherein an outer surface of the inlet has a tapered barbed shape.

15. The chest drain connector of claim 1, wherein the outlet has a tapered inner surface for connecting to an outer surface of the downstream portion of the chest drain tube.

16. The chest drain connector of claim 1, wherein the outlet has an outer surface with a tapered barbed shape for securing the outlet within the downstream portion of the chest drain tube.

17. A chest drain kit, comprising:
   a fluid collection vessel;
   a chest drain tube having an upstream portion for securing to a patient and a downstream portion for securing to the fluid collection vessel; and
   a chest drain connector comprising:
   a first part having an inlet for connecting to an upstream portion of a chest drain tube, a one-way valve and a first flange surrounding the one-way valve;
   a second part having an outlet for connecting to a downstream portion of the chest tube, a second flange and a hollow protrusion, the second flange surrounding the hollow protrusion,
   wherein the second part is connectable to the first part by securing the first flange to the second flange such that the hollow protrusion passes through the one-way valve to form an uninterrupted fluid flow passage from the inlet through the hollow protrusion and the outlet along a longitudinal axis of the connector, the first and second flanges being separable by applying a longitudinal separation force above a defined threshold separation force, wherein the one-way valve is a cross-slit valve that allows fluid to flow through the first part in a downstream direction while preventing air from entering the first part when the first and second parts are separated and is inverted by the hollow protrusion when the first and second parts of the connector are connected together.

18. A method of assembling a chest drain kit, the method comprising:

providing a chest drain kit comprising:

a fluid collection vessel;

a chest drain tube having an upstream portion for securing to a patient and a downstream portion for securing to the fluid collection vessel; and a chest drain connector comprising:

a first part having an inlet for connecting to an upstream portion of a chest drain tube, a one-way valve and a first flange surrounding the one-way valve;

a second part having an outlet for connecting to a downstream portion of the chest tube, a second flange and a hollow protrusion, the second flange surrounding the hollow protrusion, wherein the second part is connectable to the first part by securing the first flange to the second flange such that the hollow protrusion passes through the one-way valve to form an uninterrupted fluid flow passage from the inlet through the hollow protrusion and the outlet along a longitudinal axis of the connector, the first and second flanges being separable by applying a longitudinal separation force above a defined threshold separation force, wherein the one-way valve is a cross-slit valve that allows fluid to flow through the first part in a downstream direction while preventing air from entering the first part when the first and second parts are separated and is inverted by the hollow protrusion when the first and second parts of the connector are connected together;

connecting the first part of the chest drain connector to the upstream portion of the chest drain tube;

connecting the second part of the chest drain connector to the downstream portion of the chest drain tube;

connecting the downstream portion of the chest drain tube to the fluid collection vessel; and connecting the first and second parts of the chest drain connector together.

19. The method of claim 18, further comprising separating the chest drain connector by applying a longitudinal separation force above the defined threshold separation force.

20. The method of claim 18, further comprising securing the upstream portion of the chest drain tube to a patient to drain fluid from the patient's pleural cavity.

\* \* \* \* \*